United States Patent
Tsai et al.

(10) Patent No.: US 10,019,248 B2
(45) Date of Patent: Jul. 10, 2018

(54) SYSTEM AND METHOD FOR SERVICE MATCHING OF INSTANT MESSAGE SOFTWARE

(71) Applicant: INSTITUTE FOR INFORMATION INDUSTRY, Taipei (TW)

(72) Inventors: Frank Chee-Da Tsai, Taipei (TW); Wen-Jen Ho, Taipei (TW); Wen-Yao Chang, New Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 43 days.

(21) Appl. No.: 15/355,039

(22) Filed: Nov. 17, 2016

(65) Prior Publication Data

US 2018/0121184 A1    May 3, 2018

(30) Foreign Application Priority Data

Nov. 1, 2016    (TW) .............................. 105135370 A

(51) Int. Cl.

| G06F 8/61 | (2018.01) |
| H04L 29/08 | (2006.01) |
| H04L 12/58 | (2006.01) |
| G06F 9/455 | (2018.01) |
| G06F 17/30 | (2006.01) |

(52) U.S. Cl.
CPC ............ *G06F 8/61* (2013.01); *G06F 9/45558* (2013.01); *G06F 17/30864* (2013.01); *H04L 51/046* (2013.01); *H04L 67/28* (2013.01); *H04L 67/32* (2013.01); *H04L 67/34* (2013.01); *G06F 2009/4557* (2013.01)

(58) Field of Classification Search
CPC ........................................................ G06F 8/61
USPC ........................................................ 717/175
See application file for complete search history.

(56) References Cited

U.S. PATENT DOCUMENTS

| 6,205,135 | B1 * | 3/2001 | Chinni ................ H04M 7/0057 370/354 |
| 7,644,145 | B2 * | 1/2010 | Rockwell ........... G06Q 10/0875 358/1.15 |

(Continued)

FOREIGN PATENT DOCUMENTS

| TW | 200924459 A | 6/2009 |
| TW | I533143 B | 5/2016 |
| TW | 201635771 A | 10/2016 |

*Primary Examiner* — Qing Chen
*Assistant Examiner* — Clint Thatcher
(74) *Attorney, Agent, or Firm* — CKC & Partners Co., Ltd.

(57) ABSTRACT

The present invention discloses a system and method for service matching of IM software, which is adapted for operating between a plurality of user devices and a plurality of IM software supplier servers. The IM software supplier server provides at least one IM software associated service. The user device merely installs one of the plurality of IM software, and the user device can access services provided by different IM software supplier servers. The service matching method comprises: relaying a service request to the corresponding IM software supplier server according to a correspondence table defining the IM software and names of the IM software associated service when the user device makes the service request; and returning a feedback of the corresponding IM software supplier server to the user device made the service request.

20 Claims, 3 Drawing Sheets

(56) References Cited

U.S. PATENT DOCUMENTS

| | | | | |
|---|---|---|---|---|
| 8,655,341 B2* | 2/2014 | Boukai | .................... | G06F 8/61 |
| | | | | 455/418 |
| 9,043,419 B2* | 5/2015 | Fletcher | ................. | H04L 51/04 |
| | | | | 709/206 |
| 2009/0175268 A1* | 7/2009 | Li | .................... | H04L 29/06027 |
| | | | | 370/352 |
| 2010/0057857 A1* | 3/2010 | Szeto | ...................... | H04L 51/04 |
| | | | | 709/206 |
| 2010/0325146 A1* | 12/2010 | Fletcher | .............. | G06Q 10/107 |
| | | | | 707/769 |
| 2011/0082770 A1* | 4/2011 | Krishnamoorthy | | |
| | | | ........................ | G06Q 30/0629 |
| | | | | 705/26.64 |
| 2011/0252340 A1* | 10/2011 | Thomas | .............. | G06Q 10/107 |
| | | | | 715/756 |
| 2012/0088511 A1* | 4/2012 | Cheng | .................... | H04W 4/70 |
| | | | | 455/450 |
| 2014/0236935 A1* | 8/2014 | Doebele | ........... | G06F 17/30864 |
| | | | | 707/723 |

* cited by examiner 2016-06-08-11:37:55, [AAA, wychang, SB-BBB_345, movie-bot], processing

Fig. 3A 2016-06-08-11:37:45, [AAA, cheeda, SB-BBB_345, taxi-bot], processing

Fig. 3B 2016-05-30-17:24:35, [AAA, cheeda, SB-BBB_345, taxi-bot], processed

Fig. 3C 2016-05-30-17:24:35, [AAA, wychang, SB-BBB_234, health-bot], pending

Fig. 3D 2016-05-20-17:24:35, [AAA, wychang, SB-BBB_493, health-bot], cancelled

Fig. 3E

SYSTEM AND METHOD FOR SERVICE MATCHING OF INSTANT MESSAGE SOFTWARE

RELATED APPLICATIONS

This application claims priority to Taiwan Application Serial Number 105135370, filed on Nov. 1, 2016, which is herein incorporated by reference.

BACKGROUND

Field of Invention

The present invention relates to a system and method for service matching, more particularly, the present invention relates to a system and method for service matching of instant message software.

Description of Related Art

In the existing technology, the services provided by every instant message software are different. If a user wants to use a plurality of services provided by different instant message software at a single communication device, the user must install all of these different instant message software on the communication device. For example, a service A is provided by an instant message software X and a service B is provided by an instant message software Y. If the user wants to access the service A and the service B at the same communication device, the instant message software X and Y must be installed on the communication device. In other words, if the user wants to use more services, more memory space of the communication device is consumed in order to install more instant message software. Therefore, for the user, the above operation will be inconvenient.

SUMMARY

The present invention provides a system and method for service matching of instant message (IM) software, and the present invention is adapted for a user who wants to access services provided respectively by different IM software suppliers at the same one communication device. The service matching system of the present invention is interconnected between a plurality of user communication devices and IM software supplier servers. Each IM software supplier server provides a plurality of IM software associated services respectively. Through the service matching system of the present invention, users can access services provided by other IM software by merely installing one of the plurality of IM software. Therefore, users need to install only one of the plurality of IM software on the user communication device.

An aspect of the disclosure is to provide a service matching system of IM software, interconnected between a plurality of user devices and a plurality of IM software supplier servers, wherein the IM software supplier servers provide at least one IM software associated service, the user device at least installs one of the plurality of IM software, the matching system for IM software comprises: a plurality of databases, a service server having at least a virtual machine, and a service log database. The plurality of databases have at least a correspondence table defining the IM software and names of the IM software associated services and have another correspondence table defining the user device, the installed IM software of the user device, and an account name used on the installed IM software. The service server has at least a virtual machine, wherein the virtual machine installs the IM software. When the user device makes a service request for the service matching system, the virtual machine relays the service request to the corresponding IM software supplier server according to the correspondence table defining the IM software and names of the IM software associated service, the service server returns a feedback of the corresponding IM software supplier server to the user device. The service log database is used to record the service request made by the user device, the IM software supplier server which the service request is relayed to, and a processing status of the feedback of the IM software supplier server.

In one embodiment of the present invention, the service server builds a plurality of accounts for each of the IM software and chooses one of the accounts as a representative account, the plurality of databases comprise: a user account database storing the correspondence table defining the user device, the installed IM software of the user device, and the account name used on the installed IM software, when the user device adds the representative account to the installed IM software, the service server stores related information of the user device to the correspondence table defining the user device, the installed IM software of the user device, and the account name used on the installed IM software.

In one embodiment of the present invention, the plurality of databases comprise: a software service BOT database storing the correspondence table defining, for each of the plurality of IM software suppliers, the IM software and names of the IM software associated services, wherein the service server periodically collects a service name and a service feature of online software service BOT service provided by the IM software from IM software supplier server, in order to store the service name and the service feature in the correspondence table defining the IM software and names of the IM software associated services.

In one embodiment of the present invention, wherein when the user device makes a service request through the representative account, the service server automatically chooses one of the corresponding online software service BOT services according to the service names and associated features recorded in the software service BOT database or provides the plurality of corresponding online software service BOT services, according to the service names and associated features recorded in the software service BOT database, to the user device to choose, the service server chooses one of the accounts of the IM software of the corresponding online software service BOT service as a proxy IM account after the online software service BOT service is chosen, the service server certifies the proxy IM account through the service log database, and then relays the service request to the corresponding IM software supplier server.

In one embodiment of the present invention, if the service log database does not record that the proxy IM account processes the same online software service BOT service of IM software currently, the proxy IM account is certificated, the service log database records the processing status of the service request as a currently processing status.

In one embodiment of the present invention, when the corresponding IM software supplier server returns the feedback to the service server, the service server reads the service log database to find the corresponding user device and returns the feedback to the user device through the representative account, the processing status of the service request recorded in the service log database is changed to a processed status when the service request is completed.

In one embodiment of the present invention, when the service server does not receive the feedback of the corresponding IM software supplier server within a preset time, the processing status of the service request recorded in the service log database is changed to a cancelled status.

In one embodiment of the present invention, when the IM software supplier server returns that the operation of the service request must be delayed, the processing status of the service request recorded in the service log database is changed to a pending status, the service server periodically scans the service log database to find the service requests with pending status to process.

An aspect of the disclosure is to provide a service matching method for IM software, interconnected between a plurality of user devices and a plurality of IM software supplier servers, wherein the IM software supplier servers provide at least one IM software associated service, the user device installs at least one of the plurality of IM software, the matching method for IM software comprises the following steps: providing a correspondence table defining the IM software and names of the IM software associated services and providing another correspondence table defining the user device, the installed IM software of the user device, and an account name used on the installed IM software; relaying a service request to the corresponding IM software supplier server according to the correspondence table defining the IM software and names of the IM software associated service when the user device makes the service request; returning a feedback of the corresponding IM software supplier server to the user device; and building a service log database to record the service request made by the user device, the IM software supplier server which the service request is relayed to, and the processing status of the feedback of the IM software supplier server.

In one embodiment of the present invention, further comprising: building a plurality of accounts for each of the IM software and choosing one of the accounts as a representative account; and storing related information of the user device to the correspondence table defining the user device, the installed IM software of the user device, and the account name used on the installed IM software, when the user device adds the representative account to the installed IM software.

In one embodiment of the present invention, further comprising: periodically collecting a service name and a service feature of online software service BOT service provided by the IM software from IM software supplier server, in order to store the service name and the service feature in the correspondence table defining the IM software and names of the IM software associated service.

In one embodiment of the present invention, further comprising: choosing the corresponding online software service BOT service according to the service names and associated features recorded in the software service BOT database automatically or providing the corresponding online software service BOT service s, according to the service names and associated features recorded in the software service BOT database, to the user device to choose when the user device makes the service request through the representative account; and choosing one of the accounts of the IM software of the corresponding online software service BOT service as a proxy IM account after the online software service BOT service is chosen and certifying the proxy IM account through the service log database, and then relaying the service request to the corresponding IM software supplier server.

In one embodiment of the present invention, further comprising: if the service log database does not record that the proxy IM account processes the same online software service BOT service of IM software currently, the proxy IM account is certificated, the service log database records the processing status of the service request as a currently processing status.

In one embodiment of the present invention, further comprising: reading the service log database to find the corresponding user device and returning the feedback to the user device through the representative account when the corresponding IM software supplier server returns the feedback, wherein the processing status of the service request recorded in the service log database is changed to a processed status when the service request is completed.

In one embodiment of the present invention, further comprising: changing the processing status of the service request recorded in the service log database to a cancelled status if without receiving the feedback of the corresponding IM software supplier server within a preset time.

In one embodiment of the present invention, further comprising: changing the processing status of the service request recorded in the service log database to a pending status if the IM software supplier server returning that the operation of the service request must be delayed; and scanning the service log database to find the service requests with pending status to process periodically.

An aspect of the disclosure is to provide a service matching system of IM software, interconnected between a plurality of user devices and a plurality of IM software supplier servers, wherein the IM software supplier servers provide at least one IM software associated service, the user device installs at least one of the plurality of IM software, the matching system for instant message IM software comprises: a service server and a service log database. The service server has at least a virtual machine, wherein the virtual machine installs the IM software and builds a plurality of accounts for each of the IM software so as to act for a service matching between the user device and the IM software supplier server. The service log database records at least one service matching certificate, wherein the at least one service matching certificate comprises: a timestamp of one of the user devices making a service request through the installed IM software, an IM software name and an account name of the installed IM software of the user device, a proxy IM account of the accounts chosen by the service server according to the service request, a service item (i.e. online software service BOT service) of the service request, a current processing status of the service request. If the current processing status of the one service matching certificate is currently processing, the service server does not allow the proxy IM account to process other service request with the same service item, but the service server allows the proxy IM account to process other service request with a different service item.

In one embodiment of the present invention, the service server relays the service request to the corresponding IM software supplier server through the proxy IM account and returns the feedback of the IM software supplier server to the user device, the processing status of the service request recorded in the service log database is changed to a processed status when the service request is completed.

In one embodiment of the present invention, the service server relays the service request to the corresponding IM software supplier server through the proxy IM account, when the service server does not receive the feedback of the corresponding IM software supplier server within a preset time, the processing status of the service request recorded in the service log database is changed to a cancelled status.

In one embodiment of the present invention, the service server relays the service request to the corresponding IM software supplier server through the proxy IM account, when the IM software supplier server returns that the operation of the service request must be delayed, the processing status of the service request recorded in the service log database is changed to a pending status, the service server periodically scans the service log database to find the service requests with pending status to process.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3A is a schematic diagram of service matching certificate according to the first embodiment of the present invention; and FIG. 3B is a schematic diagram of service matching certificate according to the second embodiment of the present invention;

FIG. 3C is a schematic diagram of service matching certificate according to the third embodiment of the present invention;

FIG. 3D is a schematic diagram of service matching certificate according to the fourth embodiment of the present invention; and FIG. 3E is a schematic diagram of service matching certificate according to the fifth embodiment of the present invention.

DETAILED DESCRIPTION

Figure 1:
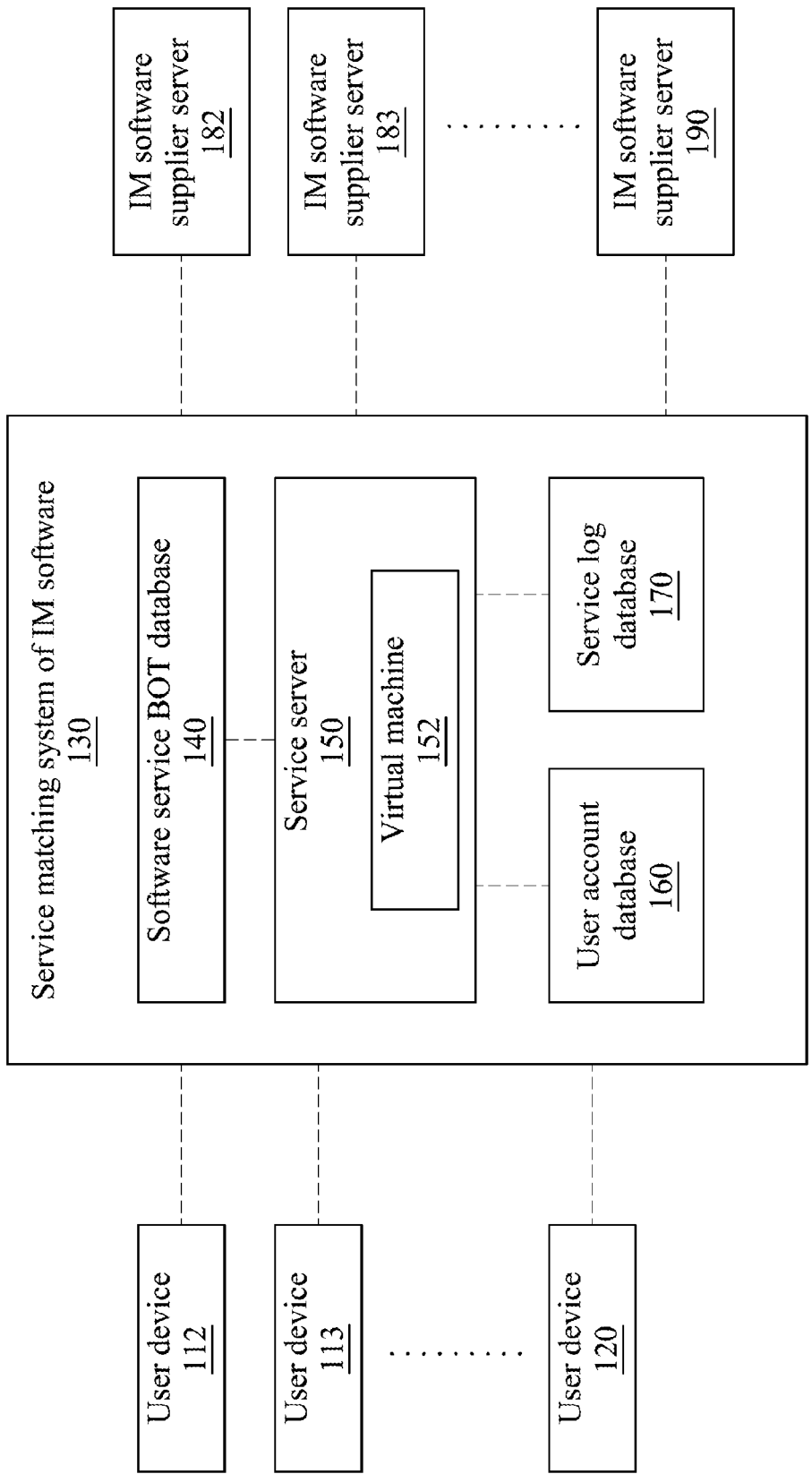
FIG. 1 is a block diagram of the service matching system according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of the service matching system according to the first embodiment of the present invention. The service matching system of the present invention is interconnected between a plurality user devices (112~120) and a plurality of IM software supplier servers (182~190). Each of the IM software supplier servers (182~190) respectively provides at least one IM software associated service. Each of the user devices (112~120) respectively installs at least one of these IM software. The user device (112~120) can be a smart phone, tablet, or any electronic device having the function of network communication.

Upon receiving service requests transmitted by the user devices (112~120), the service matching system of IM software 130 analyzes a service category or service item of these service requests and relays these service requests to the corresponding IM software supplier server. Next, the service matching system of IM software 130 returns the feedback of IM software supplier servers respectively to the corresponding user device making a service request. The service matching system of IM software 130 comprises a software service BOT database 140, a service server 150, a user account database 160, and a service log database 170. For the practical operation ways, the above different databases are configured at different storage devices or at the same one storage device, for examples, a hard disk of a computer, a server, or a readable memory of the computer.

Figure 2:
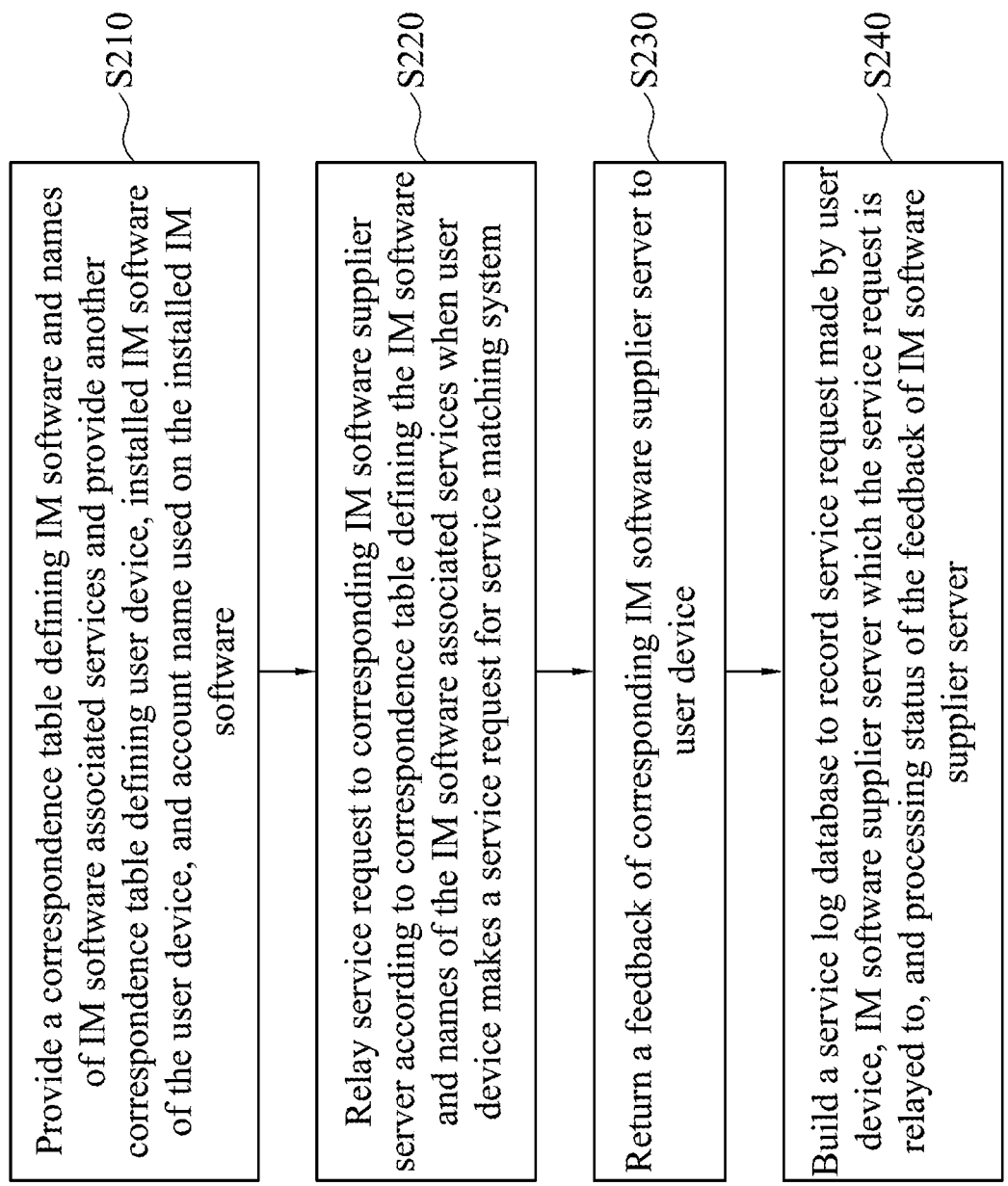
FIG. 2 is a flowchart of the service matching method according to the first embodiment of the present invention.

FIG. 2 is a flowchart of the service matching method according to the first embodiment of the present invention. Referring to FIG. 1 and FIG. 2, firstly, the service matching system of IM software 130 provides a correspondence table defining the IM software and names of the IM software associated services and provides another correspondence table defining the user device, the installed IM software of the user device, and an account name used on the installed IM software. The correspondence table defining the IM software and names of the IM software associated services is stored in software service BOT database 140. The correspondence table defining the user device, the installed IM software of the user device, and an account name used on the installed IM software is stored in the user account database 160 (Step S210).

The service matching system of IM software 130 comprises the service server 150, and the service server 150 comprises at least a virtual machine 152. The virtual machine 152 installs the plurality of IM software. When the user device (112~120) makes a service request for the service matching system of IM software 130, the virtual machine 152 of the service matching system of IM software 130 relays the service request to the corresponding IM software supplier server according to the correspondence table defining the IM software and names of the IM software associated services (Step S220). Next, the virtual machine 152 of the service server 150 returns a feedback of the corresponding IM software supplier server to the user device (Step S230). The service matching system of IM software 130 further comprises a service log database 170 used to record the service request made by the user device (112~120), the IM software supplier server (182~190) which the service request is relayed to, and a processing status of the feedback of the IM software supplier server (182~190) (Step S240).

As described above, the service server 150 builds a plurality of accounts for each IM software respectively, so as to act for the service matching between the user devices (112~120) and the IM software supplier servers (182~190). In one embodiment, the service server 150 chooses one of these accounts as a representative account. If users want to use the service matching, users can add the representative account in a friend list of the installed IM software. The user account database 160 is used to store the correspondence table defining the user device, the installed IM software of the user device, and the account name used on the installed IM software. When the user devices (112~120) add the representative account to the installed IM software, the service server 150 stores related information (such as the name of IM software which the user device installs, user name . . . etc.) of the user device to the correspondence table defining the user device, the installed IM software of the user device, and the account name used on the installed IM software.

The software service BOT database 140 is used to store a correspondence table defining the IM software and the names of the IM software associated service. The service server 150 periodically collects the service names and service features (service items, service ranges, and service time periods, etc) of the online software service BOT services provided by the IM software from IM software supplier server (182~190) in order to store these collected information to the correspondence table defining the IM software and names of the IM software associated services.

In addition, when the user devices (112~120) make the service request through the representative account, the service server 150 automatically chooses the corresponding online software service BOT service according to the service names and associated features recorded in the software service BOT database or provides the corresponding online software service BOT service s, according to the service names and associated features recorded in the software service BOT database, to the user device to choose. The service server 150 chooses one of the accounts of the IM software of the corresponding online software service BOT service as a proxy IM account after the online software service BOT service is chosen. The service server certifies the proxy IM account through the service log database 170, and then relays the service request to the corresponding IM software supplier server.

With respect to the way of certifying a proxy IM account, in one embodiment of the present invention, if the service log database 170 does not record that the proxy IM account processes the same online software service BOT service of IM software currently, the proxy IM account is certificated. The service log database 170 records a processing status of the service request as a currently processing status.

For example, the operation example of the present invention is described as follows. A user installs IM software A on a smart phone, and the user adds a virtual friend (the representative account in the above description) at a friend list of the interface of the IM software A. The virtual friend is provided by the service matching system 130 of the present invention. The user talks to the virtual friend. For example, the user inputs "taxi" at the conversation window between the IM software A and the virtual friend. If the "taxi" service is provided by IM software B, the service matching system 130 relays the service request of taxi to the supplier server of the IM software B. Next, when the supplier server of IM software B returns a feedback according to the service request, the feedback such as the vehicle number of the taxi and the waiting time, the service matching system 130 will return the feedback and show the feedback at the conversation window between the IM software A and the virtual friend. In other words, user can obtain the vehicle number of the taxi and the waiting time from the conversation window between the IM software A and the virtual friend. Namely, even the IM software B is not installed on user's smart phone, through the service matching system 130 of the present invention, the user still can use the taxi service provided by the IM software B.

In one embodiment of the present invention, when the corresponding IM software supplier server returns the feedback to the service server 150, the service server 150 reads the service log database 170 to find the corresponding user device and returns the feedback to the user device through the representative account. The processing status of the service request recorded in the service log database 170 is changed to a processed status when the service request is completed.

In one embodiment of the present invention, when the service server 150 does not receive the feedback of the corresponding IM software supplier server within a preset time. The processing status of the service request recorded in the service log database 170 is changed to a cancelled status.

In other embodiment of the present invention, when the IM software supplier server returns that the operation of the service request must be delayed, the processing status of the service request recorded in the service log database 170 is changed to a pending status. The service server 150 periodically scans the service log database 170 to find the service requests with pending status to process. For example, the service server 150 will ask the IM software supplier server again. However, the present invention is not limited to the above example.

In other embodiment of the present invention, the service log database 170 records at least one service matching certificate, and the at least one service matching certificate comprises: a timestamp of one of the user devices (112~120) making a service request through the installed IM software, an IM software name and an account name of the installed IM software of the user devices (112~120) (such as the account that the user registers in the IM software), a proxy IM account of the accounts chosen by the service server 150 according to the service request, a service item (i.e online software service BOT service) of the service request, a current processing status of the service request. If the current processing status of the service request is currently processing, the service server does not allow the proxy IM account to process other service request with the same service item, but the service server allows the proxy IM account to process other service request with the different service item.

For example, FIG. 3A is a schematic diagram of service matching certificate according to the first embodiment of the present invention. "2016-06-08-11:37:55" is the timestamp of making the service request. "AAA" is a software name of the IM software installed on the user device, and "wychang" is the user name. SB-BBB_345 is the proxy IM account which is selected from accounts according to the service request by the service server 150. "movie-bot" is a service item corresponded to the service request, and the "movie-bot" is a service of buying movie tickets provided by supplier server of IM software BBB. "Processing" represents that the current processing status of the service request is currently processing.

FIG. 3B is a schematic diagram of service matching certificate according to the second embodiment of the present invention. As illustrated in FIG. 3B, user cheeda made a service request by using IM software AAA at 11:37:45, Jun. 8, 2016. The service matching system of IM software 130 relays the service request to the supplier server of IM software BBB through proxy IM account SB-BBB_345 in order to require the associated service of the "taxi-bot". This service is currently processing. If another user wychang make a service request of the "taxi-bot" at the same time, the service matching system of IM software 130 of the present invention will not use the same proxy IM account SB-BBB_345. The service matching system will use another proxy IM account, such like SB-BBB_346 to relay the service request for user wychang, so as to avoid confusion. However, if user wychang makes a service request of "movie-bot", this service request is different from cheeda makes; the confusion situation will not be occurred. The service matching system of IM software 130 still can relay the service request to the supplier server of IM software BBB through the proxy IM account SB-BBB_345.

In other embodiment of the present invention, the service server 150 relays the service request to the corresponding IM software supplier server through the proxy IM account and returns the feedback of the IM software supplier server to the user device. The processing status of the service request recorded in the service log database is changed to a processed status when the service request is completed.

FIG. 3C is a schematic diagram of service matching certificate according to the third embodiment of the present invention. As illustrated in FIG. 3C, user cheeda made a service request by using IM software AAA at 17:24:35, May 30, 2016. The service matching system of IM software 130 relays the service request to the supplier server of IM software BBB through proxy IM account SB-BBB_345 in order to require the associated service of the "taxi-bot". After the IM software supplier server returns a feedback (called successfully or taxi number) to the proxy IM account SB-BBB_345, the service server 150 returns the feedback of the supplier server of IM software BBB to the user device of user cheeda using IM software AAA. The service matching certificate [AAA, cheeda, SB-BBB_345, taxi-bot] dictates exactly which service feedback needs to be directed to which IM account. The service request has already processed. Accordingly, service log database 170 changes the current state of the service request to a status "processed."

In other embodiment of the present invention, the service server 150 relays the service request to the corresponding IM software supplier server through the proxy IM account. When the IM software supplier server returns that the operation of the service request must be delayed, the processing status of the service request recorded in the service log database 170 is changed to a pending status. The service server 150 periodically scans the service log database to find the service requests with pending status to process.

FIG. 3D is a schematic diagram of service matching certificate according to the fourth embodiment of the present invention. As illustrated in FIG. 3D, user made a service request by using IM software AAA at 17:24:35, May 30, 2016. The service matching system 130 relays the service request to the supplier server of IM software BBB through proxy IM account SB-BBB_234 in order to require the associated service of the "health-bot" (health counseling). However, when the IM software supplier server returns that the operation of the service request must be delayed, the service log database 170 changed the current processing status of the service request to a "pending" status. The service server 150 periodically scans the service log database 170 to find some pending service requests to process.

In other embodiment of the present invention, the service server 150 relays the service request to the corresponding IM software supplier server through the proxy IM account. When the service server 150 does not receive the feedback of the corresponding IM software supplier server within a preset time, the processing status of the service request recorded in the service log database is changed to a cancelled status.

FIG. 3E is a schematic diagram of service matching certificate according to the fifth embodiment of the present invention. As illustrated in FIG. 3E, user made a service request by using IM software AAA at 17:24:35, May 20, 2016. The service matching system 130 relays the service request to the supplier server of IM software BBB through proxy IM account SB-BBB_493 in order to require the associated service of the "health-bot". However, when service server 150 does not receive the feedback of the corresponding IM software supplier server within a preset time, the service log database 170 changes the current status of the service request to a "cancelled" status.

The present invention provides a system and method for service matching, which is adapted for a user who wants to access services provided respectively by different Instant Message (IM) software supplier at the same one communication device. The service matching system of the present invention is interconnected between a plurality of user communication devices and IM software supplier servers. Each IM software supplier server provides a plurality of IM software associated services respectively. Through the service matching system of the present invention, users can access services provided by other IM software by merely installing one of the plurality of IM software. Therefore, users need to install only one of the plurality of IM software on the user communication device. Accordingly, the storage space of the user communication device will not be much consumed. The user communication device can access services provided by other IM software by merely installing one of the plurality of IM software. The operation of the present invention is more efficient.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A service matching system of instant message (IM) software, interconnected between a plurality of user devices and a plurality of IM software supplier servers, wherein the IM software supplier servers provide at least one IM software associated service, the user device installs at least one of the plurality of IM software, the matching system for IM software comprises: a processor; a computer-readable memory; a plurality of databases having at least a correspondence table defining the IM software and names of the IM software associated services, and having another correspondence table defining the user device, the installed IM software of the user device, and an account name used on the installed IM software; a service server having at least a virtual machine, wherein the virtual machine installs the IM software, when the user device makes a service request for the service matching system, the virtual machine relays the service request to the corresponding IM software supplier server according to the correspondence table defining the IM software and names of the IM software associated service, the service server returns a feedback of the corresponding IM software supplier server to the user device; and a service log database used to record the service request made by the user device, the IM software supplier server which the service request is relayed to, and a processing status of the feedback of the IM software supplier server.

2. The service matching system for IM software of claim 1, wherein the service server builds a plurality of accounts for each of the IM software and chooses one of the accounts as a representative account, the plurality of databases comprise:

a user account database storing the correspondence table defining the user device, the installed IM software of the user device, and the account name used on the installed IM software, when the user device adds the representative account to the installed IM software, the service server stores related information of the user device to the correspondence table defining the user device, the installed IM software of the user device, and the account name used on the installed IM software.

3. The service matching system for IM software of claim 2, wherein the plurality of databases comprise:
a software service BOT database storing the correspondence table defining the IM software and names of the IM software associated services, wherein the service server collects a service name and a service feature of online software service BOT service provided by the IM software from IM software supplier server periodically, in order to store the service name and the service feature in the correspondence table defining the IM software and names of the IM software associated services.

4. The service matching system for IM software of claim 3, wherein when the user device makes the service request through the representative account, the service server chooses the corresponding online software service BOT service according to the software service BOT database automatically or provides the corresponding online software service BOT services to the user device to choose, the service server chooses one of the accounts of the IM software of the corresponding online software service BOT service as a proxy IM account after the online software service BOT service is chosen, the service server certifies the proxy IM account through the service log database, and then relays the service request to the corresponding IM software supplier server.

5. The service matching system for IM software of claim 4, if the service log database does not record that the proxy IM account processes the same online software service BOT service of IM software currently, the proxy IM account is certificated, the service log database records a processing status of the service request as a currently processing status.

6. The service matching system for IM software of claim 5, wherein when the corresponding IM software supplier server returns the feedback to the service server, the service server reads the service log database to find the corresponding user device and returns the feedback to the user device through the representative account, the processing status of the service request recorded in the service log database is changed to a processed status when the service request is completed.

7. The service matching system for IM software of claim 4, wherein when the service server does not receive the feedback of the corresponding IM software supplier server within a preset time, the processing status of the service request recorded in the service log database is changed to a cancelled status.

8. The service matching system for IM software of claim 4, wherein when the IM software supplier server returns that the operation of the service request must be delayed, the processing status of the service request recorded in the service log database is changed to a pending status, the service server periodically scans the service log database to find the service requests with pending status to process.

9. A service matching method for IM software, interconnected between a plurality of user devices and a plurality of IM software supplier servers, wherein the IM software supplier servers provide at least one IM software associated service, the user device installs at least one of the plurality of IM software, the matching method for IM software comprises the following steps:
providing a correspondence table defining the IM software and names of the IM software associated services and providing another correspondence table defining the user device, the installed IM software of the user device, and an account name used on the installed IM software;
relaying a service request to the corresponding IM software supplier server according to the correspondence table defining the IM software and names of the IM software associated services when the user device makes the service request;
returning a feedback of the corresponding IM software supplier server to the user device; and
building a service log database to record the service request made by the user device, the IM software supplier server which the service request is relayed to, and a processing status of the feedback of the IM software supplier server.

10. The service matching method for IM software of claim 9, further comprising:
building a plurality of accounts for each of the IM software and choosing one of the accounts as a representative account; and
storing related information of the user device to the correspondence table defining the user device, the installed IM software of the user device, and the account name used on the installed IM software, when the user device adds the representative account to the installed IM software.

11. The service matching method for IM software of claim 10, further comprising:
collecting a service name and a service feature of online software service BOT service provided by the IM software from IM software supplier server periodically, in order to store the service name and the service feature in the correspondence table defining the IM software and names of the IM software associated services.

12. The service matching method for IM software of claim 11, further comprising:
choosing the corresponding online software service BOT service according to the software service BOT database automatically or provides the corresponding online software service BOT services to the user device to choose, when the user device makes the service request through the representative account; and
choosing one of the accounts of the IM software of the corresponding online software service BOT service as a proxy IM account after the online software service BOT service is chosen and certifying the proxy IM account through the service log database, and then relaying the service request to the corresponding IM software supplier server.

13. The service matching method for IM software of claim 12, further comprising:
if the service log database does not record that the proxy IM account processes the same online software service BOT service of IM software currently, the proxy IM account is certificated, the service log database records a processing status of the service request as a currently processing status.

14. The service matching method for IM software of claim 13, further comprising:
reading the service log database to find the corresponding user device and returning the feedback to the user device through the representative account when the corresponding IM software supplier server returns the feedback, wherein the processing status of the service request recorded in the service log database is changed to a processed status when the service request is completed.

15. The service matching method for IM software of claim 12, further comprising:
changing the processing status of the service request recorded in the service log database to a cancelled status if without receiving the feedback of the corresponding IM software supplier server within a preset time.

16. The service matching method for IM software of claim 12, further comprising:
changing the processing status of the service request recorded in the service log database to a pending status if the IM software supplier server returning that the operation of the service request must be delayed; and
scanning the service log database to find the service requests with pending status to process periodically.

17. A service matching system of IM software, interconnected between a plurality of user devices and a plurality of IM software supplier servers, wherein the IM software supplier servers provide at least one IM software associated service, the user device installs at least one of the plurality of IM software, the matching system for instant message IM software comprises: a processor; a computer-readable memory; a service server having at least a virtual machine, wherein the virtual machine installs the IM software and builds a plurality of accounts for each of the IM software so as to act for a service matching between the user devices and the IM software supplier servers; and a service log database recording at least one service matching certificate, wherein the at least one service matching certificate comprises: a timestamp of one of the user devices making a service request through the installed IM software, a software name and an account name of the installed IM software of the user device, a proxy IM account of the accounts chosen by the service server according to the service request, a service item of the service request, a current processing status of the service request, if the current processing status of the service request is currently processing, the service server does not allow the proxy IM account to process other service request with the same service item, but the service server allows the proxy IM account to process other service request with the different service item.

18. The service matching system for IM software of claim 17, wherein the service server relays the service request to the corresponding IM software supplier server through the proxy IM account and returns the feedback of the IM software supplier server to the user device, the processing status of the service request recorded in the service log database is changed to a processed status when the service request is completed.

19. The service matching system for IM software of claim 17, wherein the service server relays the service request to the corresponding IM software supplier server through the proxy IM account, when the service server does not receive the feedback of the corresponding IM software supplier server within a preset time, the processing status of the service request recorded in the service log database is changed to a cancelled status.

20. The service matching system for IM software of claim 17, wherein the service server relays the service request to the corresponding IM software supplier server through the proxy IM account, when the IM software supplier server returns that the operation of the service request must be delayed, the processing status of the service request recorded in the service log database is changed to a pending status, the service server periodically scans the service log database to find the service requests with pending status to process.

* * * * *